United States Patent
Commons et al.

(10) Patent No.: US 7,856,443 B2
(45) Date of Patent: *Dec. 21, 2010

(54) AUTOMATIC IDENTIFICATION OF DVD TITLE USING INTERNET TECHNOLOGIES AND FUZZY MATCHING TECHNIQUES

(75) Inventors: Christopher Commons, Indianapolis, IN (US); Piero Madar, Indianapolis, IN (US)

(73) Assignee: Gracenote, Inc., Emeryville, CA (US)

( * ) Notice: Subject to any disclaimer, the term of this patent is extended or adjusted under 35 U.S.C. 154(b) by 1264 days.

This patent is subject to a terminal disclaimer.

(21) Appl. No.: 10/917,686

(22) Filed: Aug. 13, 2004

(65) Prior Publication Data
US 2005/0019008 A1 Jan. 27, 2005

Related U.S. Application Data

(63) Continuation of application No. 10/002,627, filed on Dec. 5, 2001, now Pat. No. 6,983,289.

(51) Int. Cl.
  *G06F 7/00* (2006.01)
  *G06F 17/30* (2006.01)
(52) U.S. Cl. .................. 707/759; 707/765; 707/913
(58) Field of Classification Search .............. 707/758, 707/759, 765, 913, 999.002
  See application file for complete search history.

(56) References Cited

U.S. PATENT DOCUMENTS

| | | |
|---|---|---|
| 4,870,568 A | 9/1989 | Kahle et al. |
| 5,019,899 A | 5/1991 | Boles et al. |
| 5,132,949 A | 7/1992 | Choi |
| 5,206,949 A | 4/1993 | Cochran et al. |
| 5,337,347 A | 8/1994 | Halstead-Nussloch et al. |

(Continued)

FOREIGN PATENT DOCUMENTS

EP 0367585 A2 5/1990

(Continued)

OTHER PUBLICATIONS

Salam, S. , et al., "Design and implementation of an experimental video database system for supporting video retrieval from different perspectives", *Proceedings of SPIE*, vol. 3022—*Storage and Retrieval for Image and Video Databases V*, XP000742393 ISBN: 0-8194-2433-1,(324-339),Feb. 13, 1997.

(Continued)

*Primary Examiner*—John R. Cottingham
*Assistant Examiner*—Mariela D Reyes
(74) *Attorney, Agent, or Firm*—Schwegman Lundberg & Woessner, P.A.

(57) ABSTRACT

An iterative search technique is used to quickly and accurately locate information in a database, such as one storing information about digital versatile discs (DVDs). First, a presumably unique search key is generated for an unidentified DVD and compared with corresponding keys in a database. If no match is found progressively less specific information is used to generate a series of search keys that are similarly compared with corresponding keys in the database. If at least one possibly matching record is found, it is determined whether the best matching record can be considered a match, otherwise, less specific information is used to search for a match until predefined least specific information is used.

11 Claims, 6 Drawing Sheets

U.S. PATENT DOCUMENTS

| | | | |
|---|---|---|---|
| 5,388,259 A | 2/1995 | Fleischman et al. | |
| 5,446,891 A | 8/1995 | Kaplan et al. | |
| 5,475,835 A | 12/1995 | Hickey | |
| 5,483,598 A * | 1/1996 | Kaufman et al. | 380/43 |
| 5,488,725 A | 1/1996 | Turtle et al. | |
| 5,616,876 A | 4/1997 | Cluts | |
| 5,642,337 A | 6/1997 | Oskay et al. | |
| 5,659,732 A | 8/1997 | Kirsch | |
| 5,679,911 A | 10/1997 | Moriyama et al. | |
| 5,689,484 A | 11/1997 | Hirasawa | |
| 5,721,827 A | 2/1998 | Logan et al. | |
| 5,727,129 A | 3/1998 | Barrett et al. | |
| 5,740,549 A | 4/1998 | Reilly et al. | |
| 5,751,672 A | 5/1998 | Yankowski | |
| 5,781,897 A | 7/1998 | Chen et al. | |
| 5,862,223 A | 1/1999 | Walker et al. | |
| 5,884,298 A | 3/1999 | Smith, II et al. | |
| 5,903,816 A | 5/1999 | Broadwin et al. | |
| 5,918,223 A | 6/1999 | Blum et al. | |
| 5,929,857 A * | 7/1999 | Dinallo et al. | 715/840 |
| 5,959,945 A | 9/1999 | Kleiman | |
| 5,987,454 A | 11/1999 | Hobbs | |
| 6,005,565 A | 12/1999 | Legall et al. | |
| 6,012,112 A | 1/2000 | Brase et al. | |
| 6,031,795 A * | 2/2000 | Wehmeyer | 369/30.28 |
| 6,034,925 A | 3/2000 | Wehmeyer | |
| 6,035,329 A | 3/2000 | Mages et al. | |
| 6,061,306 A | 5/2000 | Buchheim | |
| 6,104,334 A | 8/2000 | Allport | |
| 6,112,240 A | 8/2000 | Pogue et al. | |
| 6,128,255 A | 10/2000 | Yankowski | |
| 6,131,129 A | 10/2000 | Ludtke et al. | |
| 6,131,130 A | 10/2000 | Van Ryzin | |
| 6,138,175 A | 10/2000 | deCarmo | |
| 6,154,773 A | 11/2000 | Roberts et al. | |
| 6,161,132 A | 12/2000 | Roberts et al. | |
| 6,201,176 B1 | 3/2001 | Yourlo | |
| 6,230,192 B1 | 5/2001 | Roberts et al. | |
| 6,247,022 B1 | 6/2001 | Yankowski | |
| 6,260,059 B1 | 7/2001 | Ueno et al. | |
| 6,272,078 B2 | 8/2001 | Yankowski | |
| 6,304,523 B1 | 10/2001 | Jones et al. | |
| 6,356,914 B1 * | 3/2002 | deCarmo et al. | 707/104.1 |
| 6,377,518 B1 * | 4/2002 | Auwens et al. | 369/30.04 |
| 6,388,957 B2 | 5/2002 | Yankowski | |
| 6,388,958 B1 | 5/2002 | Yankowski | |
| 6,434,597 B1 | 8/2002 | Hachiya et al. | |
| 6,505,160 B1 | 1/2003 | Levy et al. | |
| 6,535,869 B1 * | 3/2003 | Housel, III | 1/1 |
| 6,654,735 B1 | 11/2003 | Eichstaedt et al. | |
| 6,829,368 B2 | 12/2004 | Meyer et al. | |
| 6,941,275 B1 | 9/2005 | Swierczek | |
| 6,941,325 B1 | 9/2005 | Benitez et al. | |
| 6,983,289 B2 | 1/2006 | Commons et al. | |
| 7,302,574 B2 | 11/2007 | Conwell et al. | |
| 7,349,552 B2 | 3/2008 | Levy et al. | |
| 7,415,129 B2 | 8/2008 | Rhoads | |
| 7,461,136 B2 | 12/2008 | Rhoads | |
| 7,587,602 B2 | 9/2009 | Rhoads | |
| 7,590,259 B2 | 9/2009 | Levy et al. | |
| 2001/0052028 A1 | 12/2001 | Roberts et al. | |
| 2002/0033844 A1 | 3/2002 | Levy et al. | |
| 2002/0164004 A1 | 11/2002 | Tamura et al. | |
| 2002/0178410 A1 | 11/2002 | Haitsma et al. | |
| 2003/0023852 A1 | 1/2003 | Wold | |
| 2003/0031260 A1 | 2/2003 | Tabatabai et al. | |
| 2003/0033321 A1 | 2/2003 | Schrempp et al. | |
| 2003/0037010 A1 | 2/2003 | Schmelzer | |
| 2003/0046283 A1 | 3/2003 | Roberts | |
| 2003/0086341 A1 | 5/2003 | Wells et al. | |
| 2003/0135488 A1 | 7/2003 | Amir et al. | |
| 2003/0195863 A1 | 10/2003 | Marsh | |
| 2004/0034441 A1 | 2/2004 | Eaton et al. | |
| 2006/0026162 A1 | 2/2006 | Salmonsen et al. | |
| 2006/0167903 A1 | 7/2006 | Smith et al. | |
| 2007/0106405 A1 | 5/2007 | Cook et al. | |
| 2010/0005104 A1 | 1/2010 | DiMaria et al. | |

FOREIGN PATENT DOCUMENTS

| | | |
|---|---|---|
| EP | 0936531 A2 | 8/1999 |
| EP | 1197020 B1 | 11/2007 |
| WO | WO-9120082 | 12/1991 |
| WO | WO-9705616 A1 | 2/1997 |
| WO | WO-9721291 | 6/1997 |
| WO | WO-9802820 | 1/1998 |
| WO | WO-01/20609 | 3/2001 |
| WO | WO-0211123 A3 | 2/2002 |
| WO | WO-0246968 A2 | 6/2002 |
| WO | WO-03012695 A2 | 2/2003 |
| WO | WO-2007103583 A2 | 9/2007 |
| WO | WO-2007103583 A3 | 9/2007 |

OTHER PUBLICATIONS

"U.S. Appl. No. 10/548,702, Non-Final Office Action mailed Apr. 29, 2008", 25 Pgs.

"U.S. Appl. No. 10/913,248, Non-Final Office Action mailed Feb. 21, 2008", 17 pgs.

"U.S. Appl. No. 10/913,248, Response filed Nov. 27, 2007 to Final Office Action mailed Sep. 18, 2007", 14 pgs.

"International Application Serial No. PCT/US07/06131, International Search Report mailed Mar. 10, 2008", 4 pgs.

"International Application Serial No. PCT/US07/06131, Written Opinion mailed Mar. 10, 2008", 6 pgs.

Glickman, D., et al., "Contextual Phrase Information Content Analyzer", www.ip.com, (Jul. 1, 1982), 1-2.

Cedia, "Electronic Lifestyles Awards for Manufactures Excellence" *Entry for Best Video Product, Power Play*, pp. 1-4, Sep. 1999.

PowerPlay, *The Ultimate DVD Source.*

*Philips Ambilight TV News Release*, http://www.techdigest.tv/2006/01/ces_2006_philip_3.html, CES, (2006),2 pgs.

*USMARC Format for Bibliographic Data, Including Guidelines for Content Designation*, Prepared by Network Development & MARC Standards Office, Cataloging Distribution Service, Library of Congress,(1994),547 pgs.

*USMARC Format for Bibliographic Data, Update #2*, Prepared by Network Development & MARC Standards Office, Cataloging Distribution Service, Library of Congress,(Mar. 1996),484 pgs.

*Information Retrieval (Z39.50): Application Service Definition and Protocol Specification*, ANSI/NISO Z39.50 1995,(Jul. 1995),163 pgs.

*Bookwhere for Windows v.1.1—README*, Sea Change Corporation,(1995),2 pgs.

*GeoPac Management Guide*, Release 1.25, Geac Computer Corporation Limited,(Dec. 1994),50 pgs.

*BookWhere for Windows*, Help Topics for BookWhere,(1996),16 pgs.

*BookWhere for Windows v. 2.1—README*, Sea Change Corporation,(1996),7 pgs.

*BookWhere for Windows User Guide*, Software Version 2.0—Manual Version 2.0.4, Sea Change Corporation,(Sep. 11, 1996),1-36.

*Proposal No. 95-8—Define Field 856 (Electronic Location and Access) in the USMARC Classification Format*, http://www.loc.gov/marc/marbi/1995/95-08.html, Source: Library of Congress,(May 5, 1995),1-2.

*Proposal No. 95-1—Changes to Field 856 (Electronic Location and Access) in the USMARC Bibliographic Format*, http://www.loc.gov/marc/marbi/1995/95-01.html, Source: Library of Congress; Federal Geographic Data Committee,(Dec. 2, 1994),13 sheets.

"U.S. Appl. No. 10/002,627 Non Final Office Action mailed May 6, 2004".

"U.S. Appl. No. 10/002,627 Response filed Aug. 3, 2004 to Non Final Office Action", 9 pgs.

"U.S. Appl. No. 10/548,702 Response filed Aug. 29, 2007 to Non-Final Office Action mailed Jun. 21, 2007", 64 pgs.

"U.S. Appl. No. 10/548,702 Non-Final Office Action mailed Jun. 21, 2007", 18 pgs.

"U.S. Appl. No. 10/548,702, Final Office Action Mailed Oct. 5, 2007", FOAR,26 Pages.

"U.S. Appl. No. 10/913,248, Final Office Action mailed Sep. 18, 2007", FOAR,15 pgs.

"CD Red Book Standard", *IEC 60908 Ed. 2.0*, Sony/Philips,(1999),1-209 pgs.

"Office Action in European Application No. 01984953-8", (May 6, 2007),5 pgs.

"Sirius Satellite Radio", http://www.sirius.com, (Accessed Apr. 18, 2006),1 pg.

"Specification of the radio data system (RDS)", *IEC standard 62106:2000*; http://webstore.iec.ch/preview/info_iec62106{ed1.0}en.pdf, (2000),6 pgs.

"The Ultimate DVD Source", *Powerplay*, (Sep. 1999),2 pgs.

"XM Radio", http://www.xm-radio.com/, (Accessed Apr. 18, 2006),1 pg.

Allamanche, E , et al., "Content-Based Identification of Audio Material Using MPEG-7 Low Level Description", *Proceedings of the International Symposium of Music Information Retrieval*, (2001),8 pgs.

Beadle, H P., et al., "Location aware mobile computing", *Proceedings of the IEEE/IEE International Conference on Telecommunications*, (1997),1319-1324.

Berners-Lee, T. , et al., *Hypertext Transfer Protocol—HTTP 1.0*, Network Working Group,(May 1996),61 pgs.

Cano, P , et al., "A review of algorithms for audio fingerprinting", *Proceedings of 2002 IEEE Workshop on Multimedia Signal Processing*, Virgin Islands, USA, (2002),5 pgs.

Cano, Pedro , et al., "Robust Sound Modeling for Song Detection in Broadcast Audio", *Audio Engineering Society*, 112th Convention, Munich, Germany, (May 2002),1-7.

Chua, T. S., et al., "Content-based retrieval of segmented images", *Proceedings of the Second ACM International Conference on Multimedia*, (1994),211-218.

De Roure, David , et al., "A Multiagent system for Content Based Navigation of Music", *Proc. ACM Multimedia*, 99 (Part 2), (1999),63-66.

Hirata, K. , et al., "Media-based navigation for hypermedia systems", *Proceedings of the Fifth ACM Conference on Hypertext*, (1993),159-173.

Lewis, Paul H., et al., "Media-based Navigation with Generic Links", *Proceedings of the the Seventh ACM Conference on Hypertext*, (1996),215-223.

Martin, Keith D., et al., "Music Content Analysis through Models of Audition", (1998),8 pgs.

McNab, Rodger J., et al., "Towards the digital music library: tune retrieval from acoustic input", *Proceedings of the First ACM International Conference on Digital Libraries*, (1996),11-18.

Nilsson, M. , "ID3 tag version 2.3.0", http://www.id3.org/id3v2.3.0.txt, (Feb. 3, 1999).

Pfitzinger, H R., "The collection of spoken language resources in car environments", *ICLRE*, vol. 2, (1998),1097-1100.

Plenge, G. , "DAB—A new radio broadcasting system—State of development and ways for its introduction", *Rundfunktechnische Mitteilungen*, 35(2), (1991),45-66.

Roscheisen, M. , et al., "Beyond browsing: shared comments, SOAPs, trails, and on-line communities", *Computer Networks and ISDN Systems*, 27(6), (Apr. 1995),739-749.

Rowan, Clem W., et al., "When car radios were illegal: A history of early American and European car radios", *Society of Automotive Engineers Technical Paper Series*, (1985),1-20.

Samson, et al., "Search times using hash tables for records with non-unique keys,", *The Computer Journal*, (Dec. 1976),210-214.

Seltzer, Richard , "The AltaVista Search Revolution", *Osborne McGraw-Hill*, (1997),7, 8; 215-37.

Thimbleby, H. , et al., "Ethics and Consumer Electronics", *Proceedings of the 4th ETHICOMP International Conference on the Social and Ethical Impacts of Information and Communication Technologies*, (1999),9 pgs.

Tibbetts, Margery , Sep. 1995 *ZIG Meeting Minutes*, ftp://lcweb.loc.gov/pub/z3950/minutes/9509.txt,(Sep. 25, 1995),22 pgs.

Tompa, F. W., et al., "Hypertext by link-resolving components", *Proceedings of the Fifth ACM Conference on Hypertext*, (1993),118-130.

Troll, Denise , Z39.50 *Implementors Group Meeting Minutes*, ftp://lcweb.loc.gov/pub/z3950/minutes/9504.txt,(Apr. 25, 1995),29 pgs.

Wold, E. , "Content-based classification, search,. and retrieval of audio", *IEEE MultiMedia*, 3(3), (Fall 1996),27-36.

Zhang, Hongjiang , et al., "Video Parsing, Retrieval and Browsing: An Integrated and Content-Based Solution", *ACM Multimedia 95—Electronic Proceedings*, San Francisco, California,(Nov. 5-9, 1995),19 pgs.

"U.S. Appl. No. 10/548,702, Response filed Jul. 8, 2008 to Non Final Office Action mailed Apr. 29, 2008", 14 pgs.

"U.S. Appl. No. 10/548,702, Final Office Action mailed Sep. 16, 2008", 23 pgs.

"U.S. Appl. No. 10/002,627, 312 Amendment filed Feb. 18, 2005", 8 pgs.

"U.S. Appl. No. 10/002,627, Notice of Allowance mailed Dec. 23, 2004", 3 pgs.

"U.S. Appl. No. 10/002,627, Preliminary Amendment filed Feb. 15, 2002", 2 pgs.

"U.S. Appl. No. 10/913,248, Non Final Office Action mailed Jan. 24, 2007", 20 pgs.

"U.S. Appl. No. 10/913,248, Response filed Jun. 25, 2007 to Non Final Office Action mailed Jan. 24, 2007", 11 pgs.

"U.S. Appl. No. 11/716,269, Non-Final Office Action mailed Apr. 14, 2009", 30 pgs.

"U.S. Appl. No. 11/716,269, Final Office Action mailed Jan. 4, 2010", 21.

"U.S. Appl. No. 11/716,269, Response filed Sep. 14, 2009 to Non Final Office Action mailed Apr. 14, 2009", 19 pgs.

"European Application Serial No. 04716679.8, Office Action mailed Jul. 14, 2009", 4 pgs.

Wells, Maxwell J, et al., "Music Search Methods Based on Human Perception", U.S. Appl. No. 09/556,086, filed Apr. 21, 2000, 50 pgs.

* cited by examiner

AUTOMATIC IDENTIFICATION OF DVD TITLE USING INTERNET TECHNOLOGIES AND FUZZY MATCHING TECHNIQUES

CROSS REFERENCE TO RELATED APPLICATIONS

This is a continuation application of U.S. patent application Ser. No. 10/002,627, filed on Dec. 5, 2001 now U.S. Pat. No. 6,983,289. U.S. patent application Ser. No. 10/002,627 is herein incorporated by reference in its entirety.

BACKGROUND OF THE INVENTION

1. Field of the Invention

The present invention is directed to searching for items in a database and, more particularly, to searching for information about a digital versatile disc based on the contents of the discs.

2. Description of the Related Art

One common task in data mining and pattern recognition is to extract specific records from a large database given a finite set of qualifiers. The technique used to accomplish this task are selected from among many available techniques based upon characteristics of the data being searched and the data that provides the search key(s). Some types of data have been searched for decades, e.g., census data, tax return data, data obtained from intelligence gathering, etc. However, as new sets of data are generated, the techniques used must be selected or modified for that particular set of data.

Digital video or versatile discs (DVDs) were first produced in late 1996 and by the end of 1997 there were fewer than 700 different DVDs available. By the end of 2000, there were over 10,000 different DVD available for Region 1 (U.S., Canada and U.S. Territories) and 15,000 in all regions. As of Dec. 4, 2001, there were over 15,000 in Region 1 alone. As a result of this recent, fast growth in records that could be stored in a DVD database, the unique characteristics of searching for DVD data are only now being identified. On the other hand there is a significant need for the information that could be stored in a DVD database, at least by owners of DVD changers, because the vast majority of existing DVDs do not store a title in text format.

Following is a list of some of the information which can be stored as text on a DVD, including the title of the DVD. The abbreviations for this information are used in the description of the invention.

DVD Video Specifications for Read-Only Disc Part 3, Version 1.12 July 2000
    VMGI—Video Manager Information.
    VMGI_MAT—Video Manager Information Management Table
    TT_SRPT_SA—Start Address of Title Search Pointer Table
    VTS_Ns—Number of Video Title Sets
    TT_SRPT—Title Search Pointer Table
    TT_SRPT_Ns—Number of Title Search Pointers
    TT_SRP—Title Search Pointer
    PTT_Ns—Part_of_Titles
    VTSN—Video Title Set number
    VTS_TTN—Video Title Set Title number
    VTSI—Video Title Set Information
    VTS_PTT_SRPT_SA—Start Address of Video Title Set Part_of_Titles Search Pointer
    VTS_PGCIT_SA—Start Address of Program Chain Information Table
    VTS_PTT_SRPT—Video Title Set Part_of_Titles Search Pointer
    TTU_SA—Start Address of Title Unit
    TTU_SRP—Title Unit Search Pointer
    PTT_SRP—Part_of_Titles Search Pointer
    PGCN—Program Chain Number
    PGN—Program Number
    VTS_PGCIT—Video Title Set Program Chain Information Table
    VTS_PGCI_SRP—Video Title Set Program Chain Information Search Pointer
    VTS_PGCI_SA—Start Address of Video Title Set Program Chain Information
    VTS_PGCI—Video Title Set Program Chain Information
    PGCI—Program Chain Information
    PGCI_GI—Program Chain Information General Information
    PGC_CNT—Program Chain Contents
    C_PBIT_SA—Start Address of Cell Playback Information Table
    PGC_PGMAP_SA—Start Address of PGC_PGMAP
    C_PBIT—Cell Playback Information Table
    C_PBI—Cell Playback Information
    C_PBTM—Cell Playback Time Now that DVD changers holding 100 discs or more are becoming available, the same problem experienced with CD changers holding hundreds of discs is being experienced. It is difficult for a user to identify a desired disc without supplemental information stored in a searchable database. A simple list of titles is a bare minimum and it is desirable to have additional information, including information that cannot be obtained from the discs themselves, such as a description, synopsis, rating, genre, performers, directors and other production staff, cover art, etc. Systems displaying such information stored in databases, such as TUNEBASE from Escient are known for CDs and can be adapted for DVDs. However, it is desirable to avoid manual operations required to select information in a database containing 10,000 to 15,000 or more records, particularly when there are often several similar records, such as when a DVD title is released several times in a special edition, directors cut, etc.

SUMMARY OF THE INVENTION

It is an aspect of the present invention to provide a method and system for automatically identifying DVDs using a database of available DVDs.

Another aspect of the present invention is to provide a method of locating information in a database using an iterative process starting with a unique identifier and using increasingly less specific search keys, until a predefined least specific information is used.

A further aspect of the present invention is to use hash coding of data on which such searches are based.

Yet another aspect of the present invention is to provide a method for extracting the unique data from the DVD consisting of the number of titles, chapters per title and frames per chapter.

The above aspects can be attained by a method of finding at least one record in a database corresponding to a digital versatile disc, including receiving unique information about an unidentified digital versatile disc, including at least one of a title of the unidentified digital versatile disc, a volume name of the unidentified digital versatile disc, time stamp information for creation of a master of the unidentified digital versatile disc, a number of titles on the unidentified digital versatile disc, a number of chapters per title on the unidentified digital versatile disc, and a number of frames per chapter on the unidentified digital versatile disc; and identifying possibly matching records in a database of information about digital versatile discs using the unique information from the unidentified digital versatile disc.

The above aspects can also be attained by a method of searching for a match in a database, including obtaining a unique search key based on hash coding of uniquely identifying information from data to be matched with a record in the database; using the unique search key to search for a matching record in the database; obtaining a non-unique search key based on hash coding of non-uniquely identifying information from the data to be matched, if no match is found using the unique search key; using the non-unique search key to search for at least one possibly matching record in the database; and repeating the obtaining and using of non-unique search keys based on hash coding of progressively less specific information from the data to be matched, each time no possibly matching records are found, until predefined least specific information is used.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

The present invention may be implemented in many different ways depending on the location of the database(s) to be searched relative to the source of the search key(s) used to locate information in the database. In the embodiment described below, the search keys are obtained from a DVD containing at least one video and the information defined by the DVD Specifications for Read-Only Disc: Part 3 Video Specifications Version 1.12 which are listed above. Both a local database stored in a device in close proximity to the disc and a remote database accessed via a communication network may be searched. However, aspects of the invention may be useful in many other situations, including a database that is stored only locally or remotely, or distributed over a network. Furthermore, the source of the search keys is not limited to DVDs with video content, but other sources of search keys, even manual input, could be used.

Figure 1:
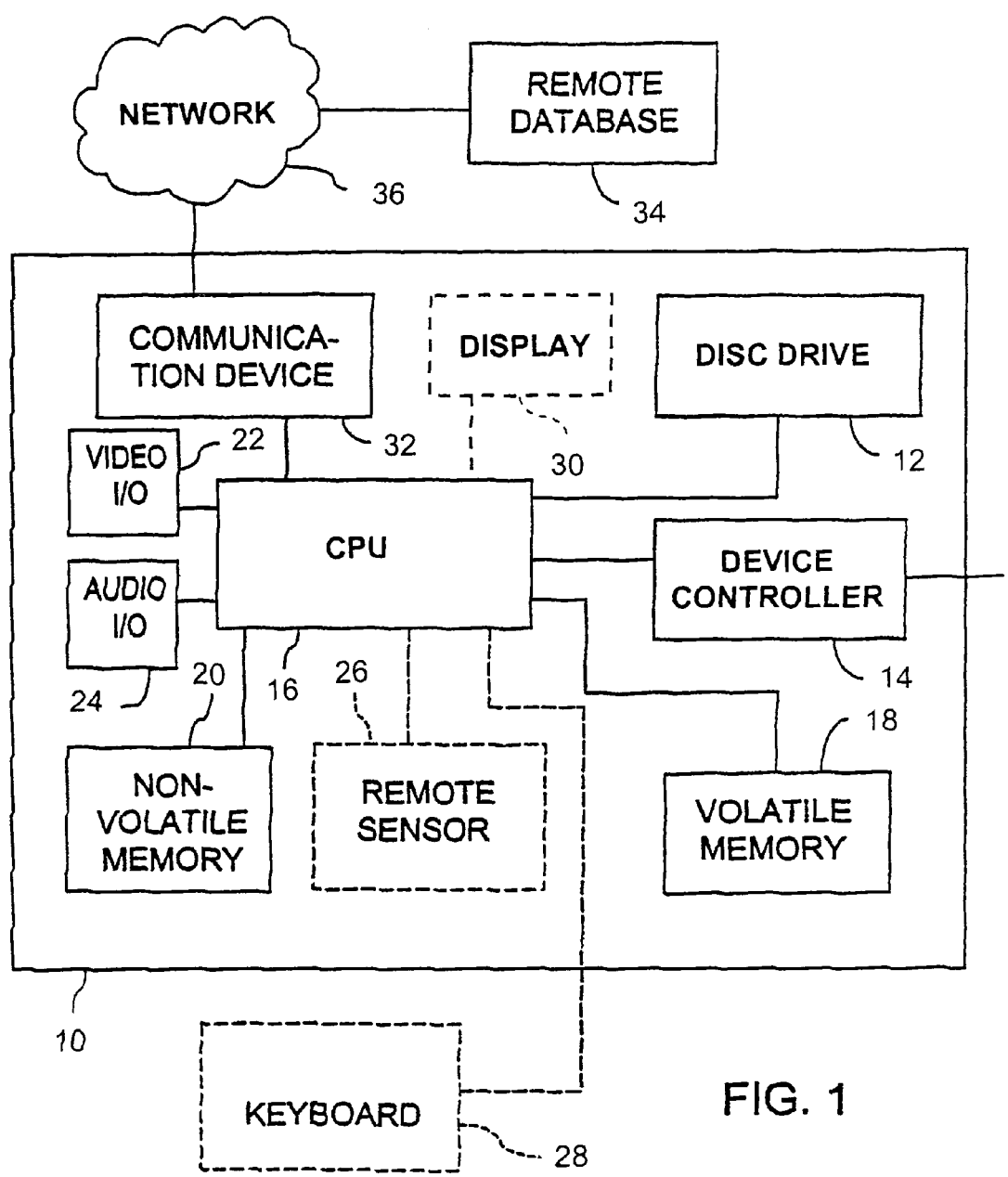
FIG. 1 is a block diagram of a system according to the present invention

A block diagram of an exemplary system to which the present invention can be applied is illustrated in FIG. 1. A local device 10 may include an internal disc drive 12 or an external device controller 14 for connection to external disc drives (not shown). In either case (or both cases if both are included) information from a DVD disc is provided to CPU 16 to generate search keys. In most systems in which the present invention would be implemented, local device 10 will also include volatile memory 18, such as random access memory (RAM) and nonvolatile memory 20, such as a hard drive. In the exemplary embodiment, local device 10 also includes video input/output 22 and audio input/output 24 which at least provide for output of the video and audio contents of the DVDs. Local device 10 is likely to also include components for user input and output which are represented by dashed lines in FIG. 1, because they are not closely related to the essential features of the present invention which is automatic identification of DVDs. Remote sensor 26 and keyboard 28 receive input from a user, either wirelessly via remote sensor 26 or through keyboard 28 whether directly connected or not. Display 30 may be mounted on the exterior of an enclosure containing the other components illustrated in local device 10. Alternatively or in addition, information may be displayed to the user on an external device coupled to video input/output 22 or by speech synthesis or recorded audio using audio input/output 24.

Nonvolatile memory 20 may be used to store only discs that have been identified or may also store a database of popular discs. However, even if the entire database for a region were stored in nonvolatile memory 20 which might require so much memory that it would be unlikely, some way of updating the database would be required as new discs are released. Although a data DVD could be used to distribute updates, in the preferred embodiment, local device 10 includes communication device 32 to access remote database 34 via network 36 to automatically obtain the most recent updated information without shipping costs or requiring manual operations by users. As a result, nonvolatile memory 20 is only required to be large enough to store a single user's collection of DVDs which is likely to be at most in the hundreds, rather than tens of thousands.

Figure 2A:
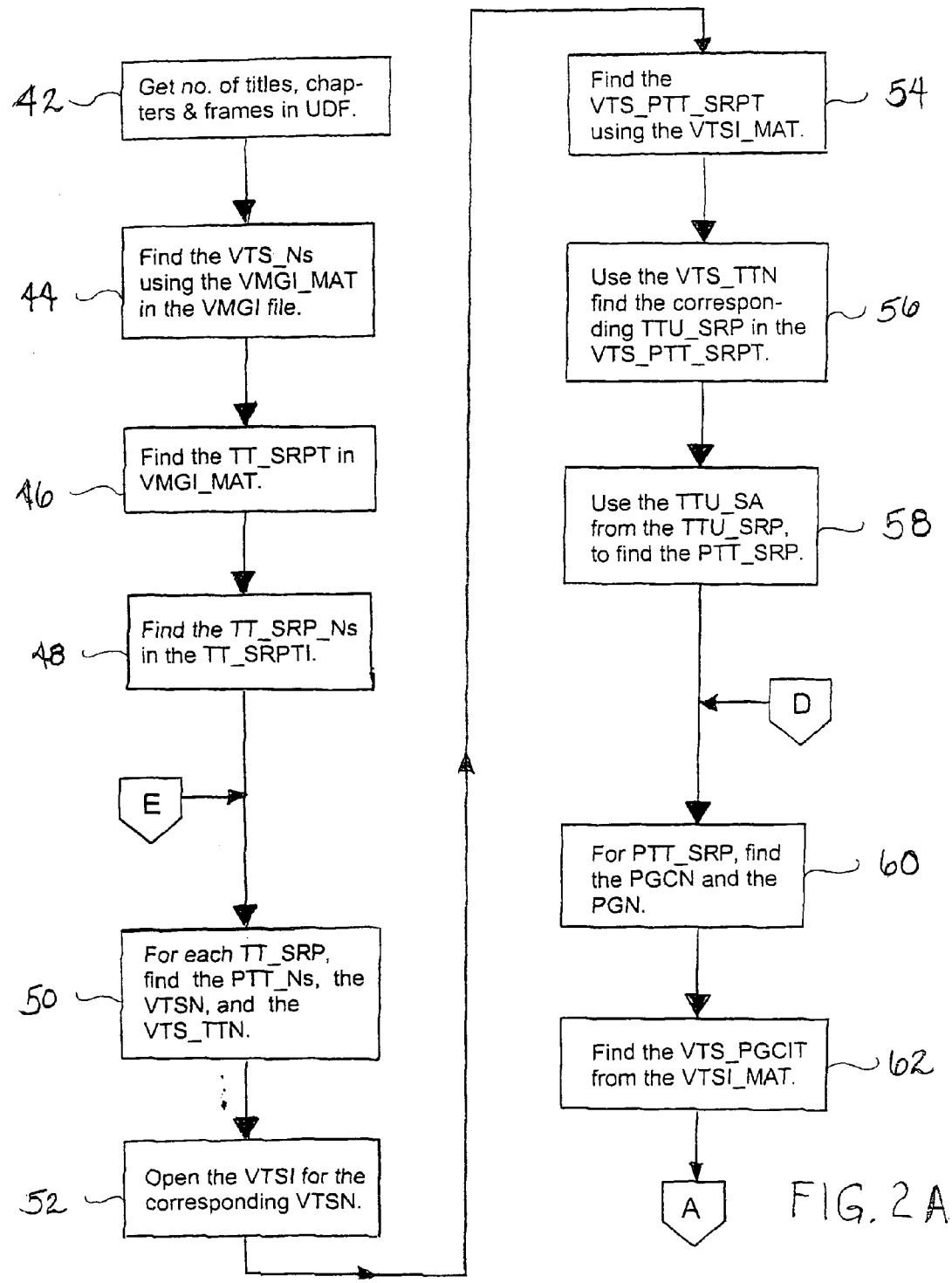
FIGS. 2A-2C are a flowchart of a method for obtaining data from a DVD.
Figure 2B:
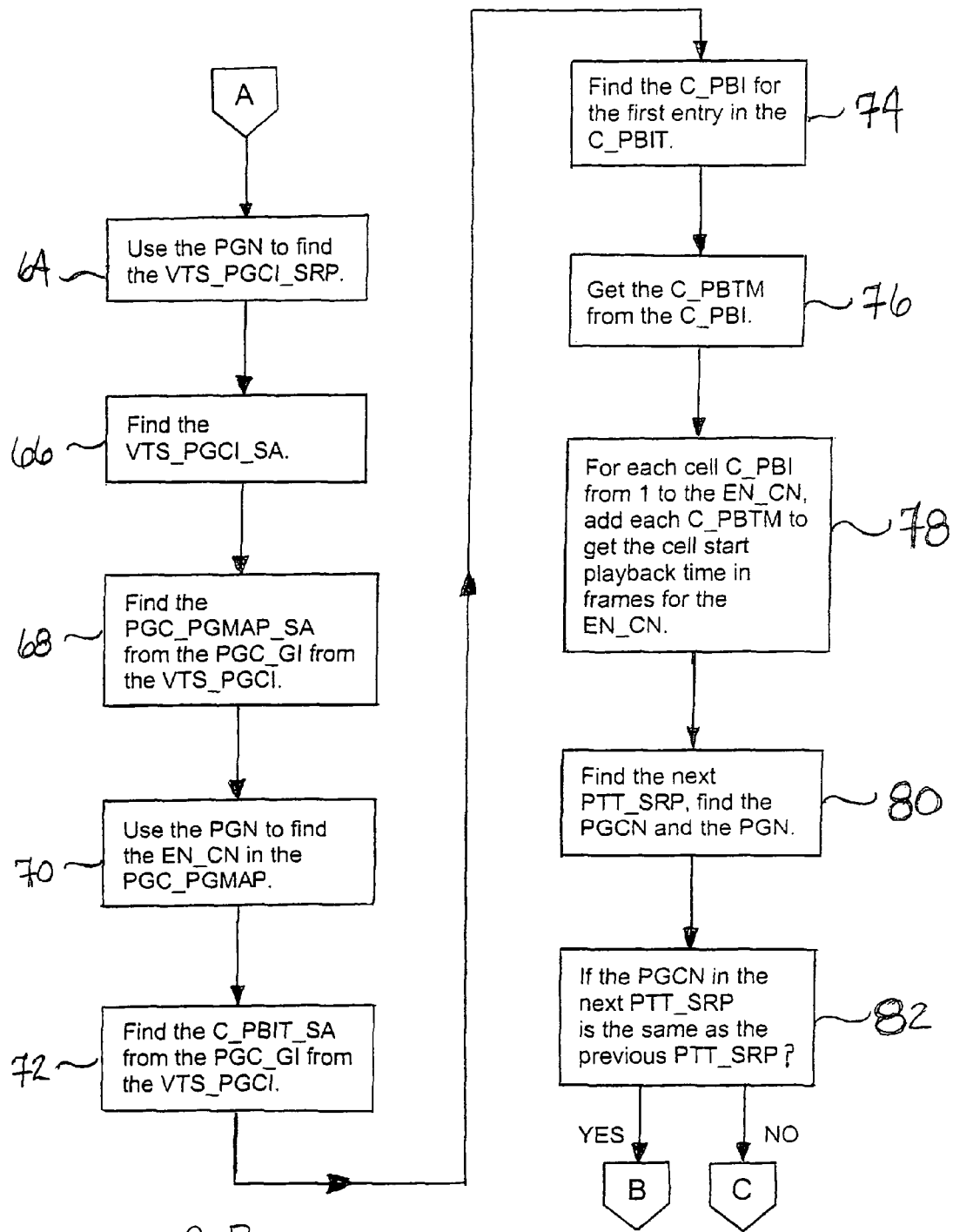
Figure 2C:
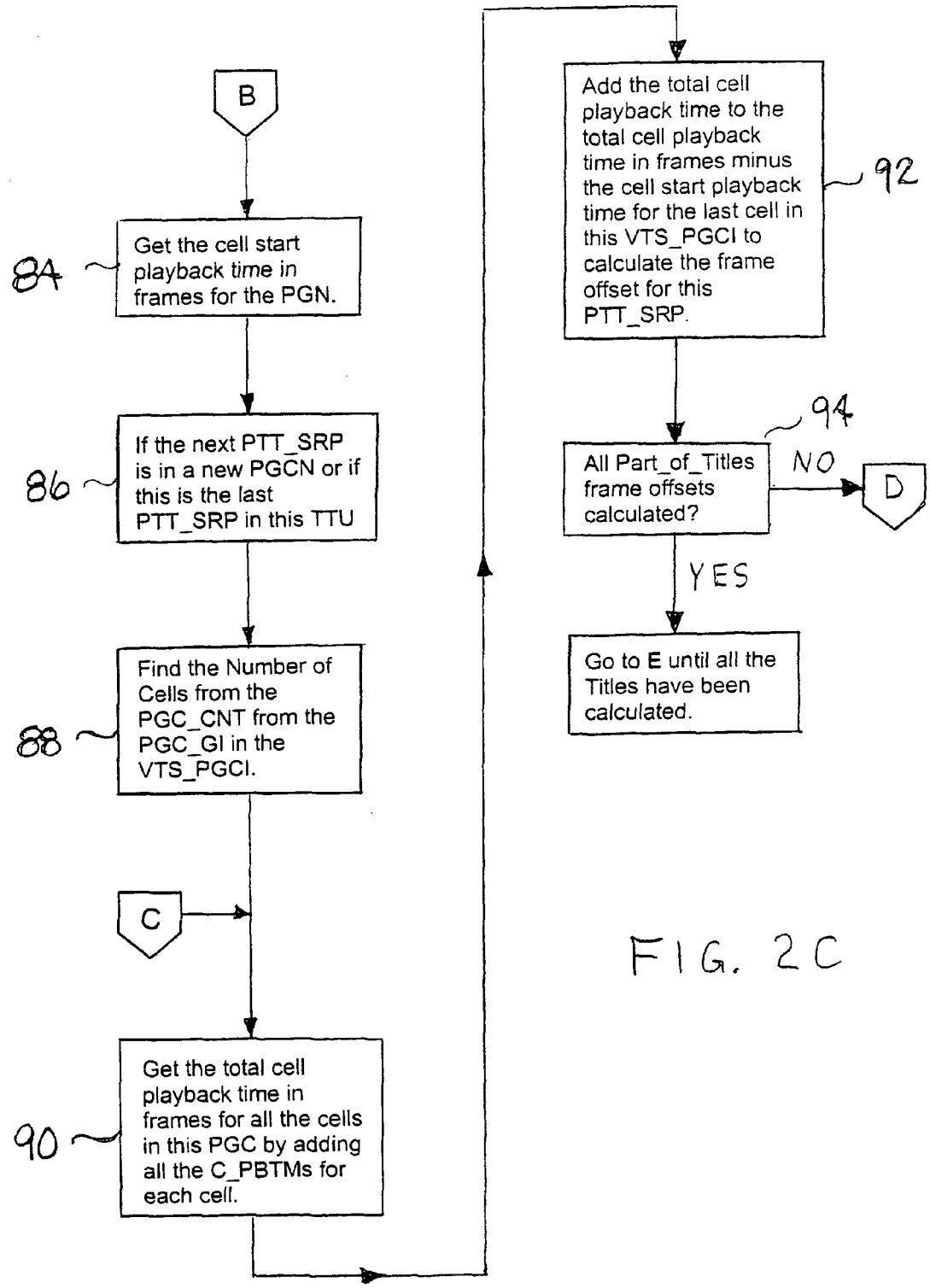

Regardless of whether the database being searched is stored locally or remotely, the method illustrated in FIGS. 2A-2C may be used to obtain information from a DVD to generate search keys. CPU 16 causes disc drive 12 or external device controller 14 to access 42 the Universal Disk Format (UDF) area on a DVD to obtain the number of titles, chapters and frames which are used to generate a unique search key, as described below. If no match is found for the unique search key, the video manager information management table (VMGI_MAT) in the video manager information (VMGI) file on the DVD and can be used to find 44 the number of video title sets (VTS_Ns) and the title search pointer table (TT_SRPT) can be found 46 therein. CPU 16 also finds 48 the number of title search pointers (TT_SRP_Ns) in the title search pointer table information (TT_SRPTI).

After the above information is obtained, for each title search pointer (TT_SRP) CPU 16 finds 50 the Part_of_Titles (PTT_Ns), video title set number (VTSN) and video title set title number (VTS_TTN). The VTSN is used to open 52 corresponding video title set information (VTSI) which contains a video title set information management table (VTSI_MAT). Using the VTSI_MAT, CPU 16 finds 54 the video title set Part_of_Titles search pointer (VTS_PTT_SRPT). Next, the VTS_TTN is used 56 to find the corresponding title unit search pointer (TTU_SRP) in the VTS_PTT_SRPT. The TTU_SRP includes a start address of title unit (TTU_SA) that is used 58 to find the Part_of_Titles search pointer (PTT_SRP).

With this information, the PTT_SRP is used to find 60 a program chain number (PGCN) and a program number (PGN). Next, the video title set program chain information table (VTS_PGCIT) is obtained 62 from the VTSI_MAT. The PGN obtained using the PTT_SRP is used 64 to find the video title set program chain information search pointer (VTS_PGCI_SRP). The VTS_PGCI_SRP is used to find 66 the start address of video title set program chain information (VTS_PGCI_SA) for video title set program chain information (VTS_PGCI). From the VTS_PGCI program chain information general information (PGCI_GI) is obtained from which the program chain program map start address (PGC_PGMAP_SA) can be found 68 for the program chain program map (PGC_PGMAP). The PGN is used 70 to find the entry cell number (EN_CN) in the PGC_PGMAP. Next, the start address of cell playback information table (C_P-BIT_SA) is found 72 in the PGC_GI from the VTS_PGCI. In the first entry of the C_PBIT, cell playback information (C_PBI) is found 74. The cell playback time (C_PBTM) is obtained 76 from the (C_PBI). This is used to initialize a cumulative number to which is added 78 the C_PBTM in each cell C_PBI from one to the EN_CN to get the cell start playback time in frames for the EN_CN.

The next PTT_SRP is found 80 and used to obtain the corresponding PGCN and PGN. If it is determined 82 that the PGCN in the next PTT_SRP is the same as the previous PTT_SRP, the following steps are performed. Otherwise, the total cell playback time is obtained as described in the next paragraph. First, the cell start playback time in frames is obtained 84 for the PGN. If it is determined 86 that the next PTT_SRP is a new PGCN or if this is the last PTT_SRP in this title unit (TTU), the number of cells is found 88 from the program chain contents (PGC_CNT) from the PGC_GI in the VTS_PGCI.

The total cell playback time in frames is obtained 90 for all the cells in this PGC by adding all the C_PBTMs for each cell. The total cell playback time is added 92 to the total cell playback time in frames minus the cell start playback time for the last cell in this VTS_PGCI to calculate the frame offset for this PTT_SRP. If it is determined 94 that all Part_of_Titles frame offsets have not been calculated, processing returns to step 60. If they have all been calculated, processing returns 96 to step 50 for the next TT_SRP.

With the information obtained using the procedure in FIGS. 2A-2C, search keys can be generated on a variety of information to obtain additional data related to the DVD that is not stored on the DVD. For example, the title of the unidentified digital versatile disc (DVD), the volume name of the unidentified DVD, time stamp information for creation of a master of the unidentified DVD, the number of titles on the unidentified DVD, the number of chapters per title on the unidentified DVD and the number of frames per chapter on the unidentified DVD may be used in different steps of an iterative process to find a matching record in a large database of DVDs. The volume name of the unidentified DVD and the time stamp information for creation of a master of the unidentified DVD can be found in the Universal Disk Format (UDF) sectors of the unidentified DVD. On the other hand, the number of titles, chapters per title and frames per chapter are obtained from the video manager information (VMGI) and title set information (VTSI).

Figure 3A:
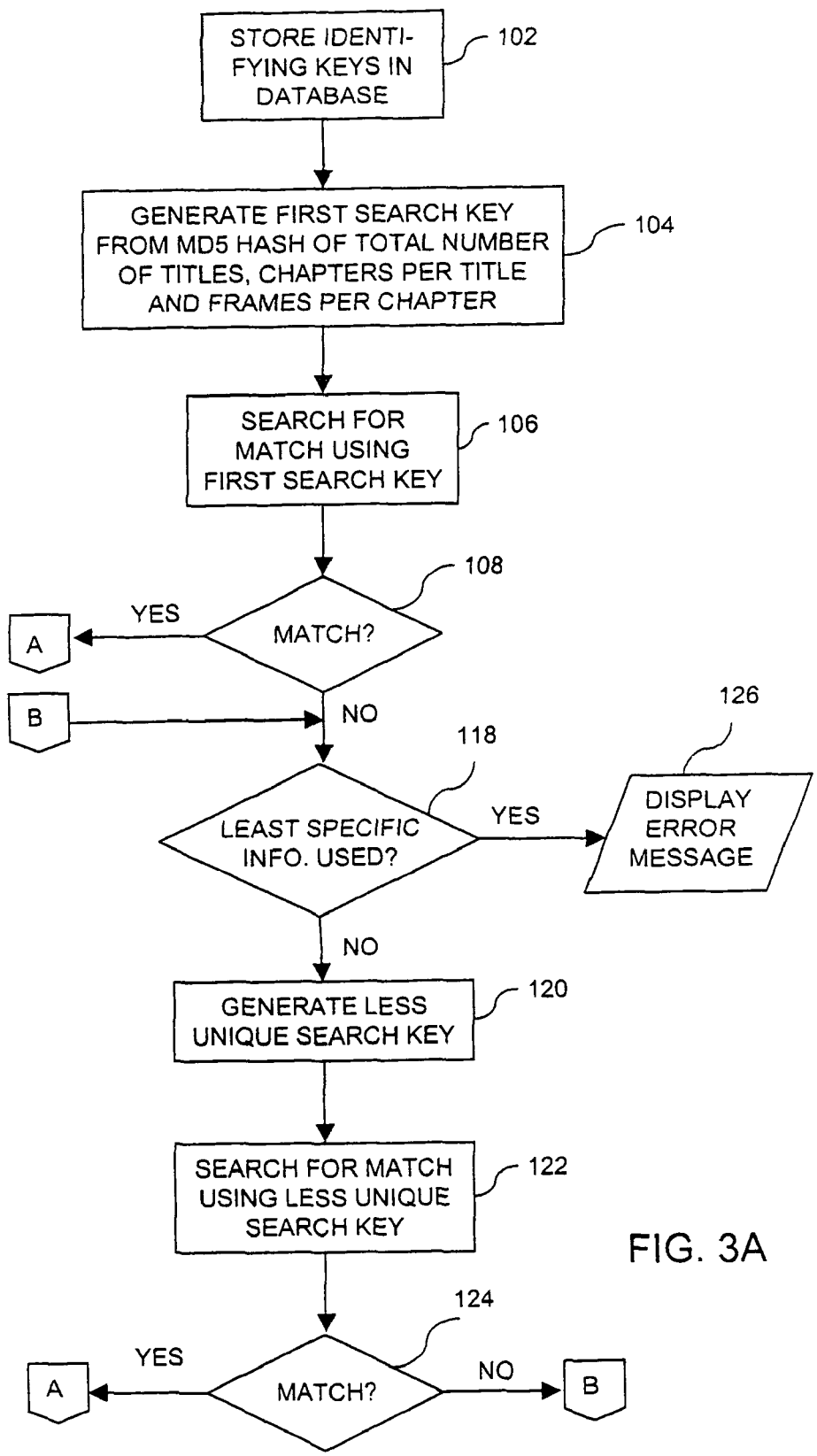
FIGS. 3A and 3B are a flowchart of a method according to the present invention.
Figure 3B:
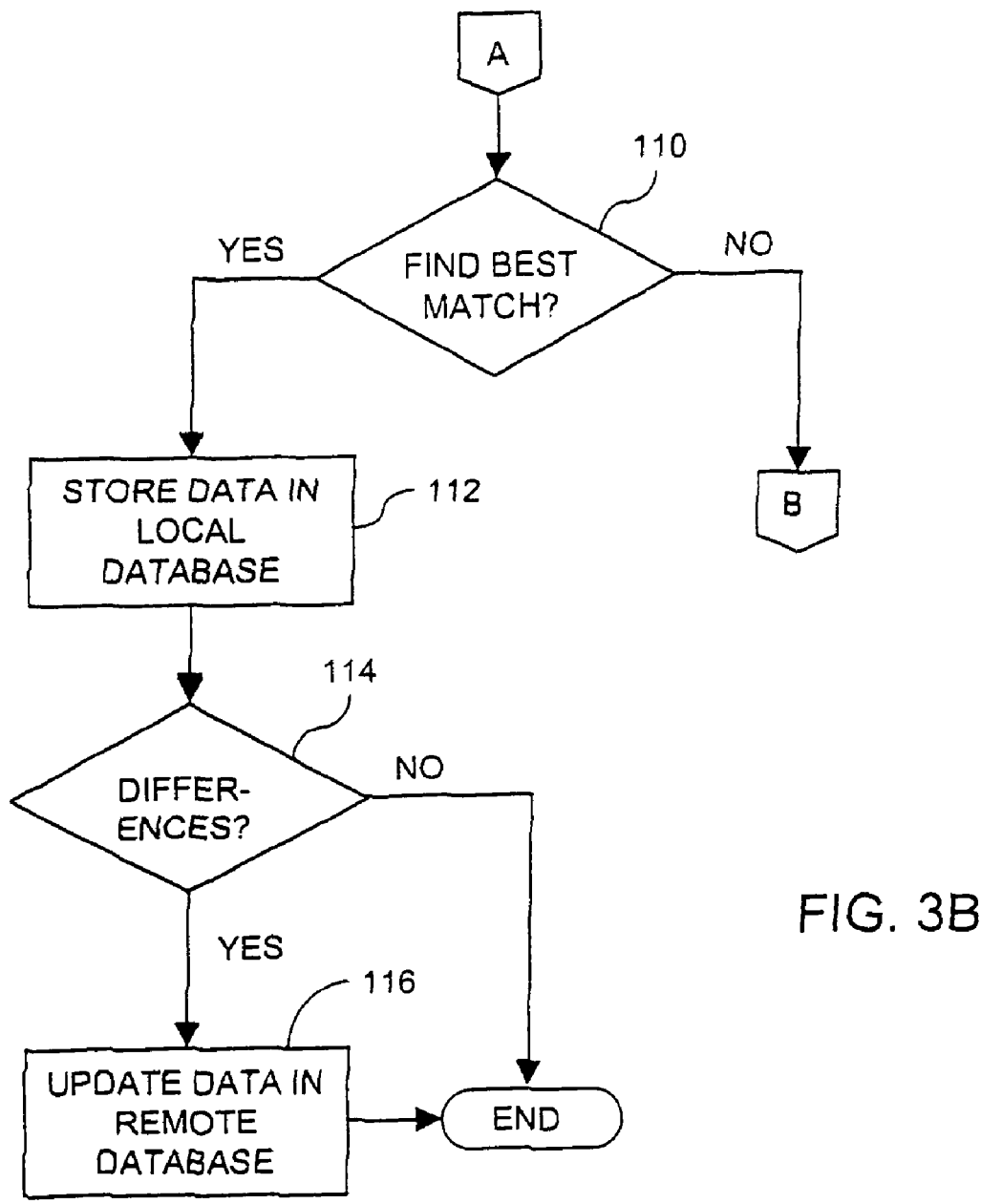

In the preferred embodiment an iterative process is used to find a matching database in the record as quickly and accurately as possible using the method illustrated in FIGS. 3A and 3B. In remote database 34, a set of identifying keys are stored 102 that are constructed in the manner described below for each of the search keys. A first search key which should be unique is generated 104 based on the total number of titles, chapters per title and number of frames per chapter. The first search key is used to search 106 for a matching record in the database. In the preferred embodiment, the unique search key is a hash code of at least a portion of this presumably uniquely identifying information. A message digest algorithm, such as MD5 is preferably used to produce the hash code.

If it is determined 108 that there is at least one possible match, the procedure illustrated in FIG. 3B is performed. First it is determined 110 whether there is a best match. Although the first identifying key should be unique, there is a possibility of duplicate or almost duplicate records in the database. Therefore, if more than one match is found, the number of titles and number of chapters per title of a corresponding DVD in each of the possibly matching records are compared with the number of titles and number of chapters per title of the unidentified DVD to find a best matching record. If none of the records match within predetermined criteria, the search continues using another key. If a best match is found and a database is maintained of the DVDs in possession of the user, at least some of the information from the general database is stored 112 (or flagged) in a database, e.g., in non-volatile memory 20, containing information about the user's DVDs. If any differences exist 114 between the number of titles and the number of chapters per title, but the differences are within the predetermined criteria, i.e., it is determined that the best matching record corresponds to the unidentified DVD, at least one of the number of titles and the number of chapters per title of the unidentified DVD is stored in the best matching record, to update 116 the information in remote database 34.

If it is determined 108 that no match is found, the search is repeated with progressively less specific information. Prior to the second search, it will be determined 118 that the least specific information has not been used. Therefore, a second (non-unique) search key is generated 120 based on non-uniquely identifying information to search 122 the database for at least one possibly matching record. In the preferred embodiment, the second search key is generated by concatenating a predetermined number of characters of the volume name and hash coded time stamp information that may be generated using the MD5 algorithm. Corresponding second identifying keys stored in the database records are compared 122 to identify possibly matching records. If at least one possible match is found 124, the procedure illustrated in FIG. 3B is performed to determine whether the best matching record is acceptable. If it is determined that the best matching record corresponds to the unidentified DVD, the local and remote databases are updated in a manner similar to that described above with respect to a match found using the first search key.

If no match is found using the second search key, a third search key is generated 120 using from the number of chapters and frames per chapter of the first title with the largest number of chapters on the unidentified DVD. Preferably, the hash code for the third search key is generated using the MD5 algorithm. Corresponding third identifying keys stored in the database records are compared 122 to identify possibly matching records. If at least one possibly matching record is found, the best matching record is selected and it is determined whether the best matching record corresponds to the unidentified DVD. If a match is found, the local and remote databases are updated as described above.

If no match is found using the third search key, a fourth search key is generated 120 using a hash code that is less unique than the hash code used in the third search key, but also uses the number of chapters and frames per chapter of the first title with the largest number of chapters on the unidentified DVD. Preferably, the hash code used in the fourth search key will permit the number of frames per chapter to vary by as many as 100 frames. Any known technique for generating fuzzy search keys may be used. Corresponding fourth identifying keys stored in the database records are compared 122 to identify possibly matching records. If at least one possibly matching record is found, the best matching record is selected and it is determined whether the best matching record corresponds to the unidentified DVD. If a match is found, the local and remote databases are updated as described above.

If the fourth search key does not produce a match, a fifth search key is generated 120 based on the title of the unidentified DVD stored in the VTSI for comparison 122 with the titles stored in the database. Fuzzy matching techniques may be used to match the titles. If at least one possibly matching record is found 124, the best matching record is determined using the procedure illustrated in FIG. 3B. In the preferred embodiment, the title comparison is the least specific test.

Therefore, if there is no matching title, or all of the possibly matching records do not meet the criteria to be considered a match, the user is informed 126. The remote database provider may also receive information about a DVD that is not stored in the database.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of finding at least one record in a database corresponding to a digital versatile disc, comprising:
   receiving unique information about the digital versatile disc, the unique information including at least one non-blank information field selected from a plurality of non-blank information fields, the plurality of non-blank information fields comprising a title of the digital versatile disc, a volume name of the digital versatile disc, time stamp information for creation of a master of the digital versatile disc, a number of titles on the digital versatile disc, a number of chapters per title on the digital versatile disc, and a number of frames per chapter on the digital versatile disc; and
   identifying one or more possibly matching records in a database of information about digital versatile discs using the unique information about the digital versatile disc, the identifying comprising:
   generating a first search key based on the unique information,
   generating a second search key based on at least one field from the plurality of non-blank information fields, the second search key being less specific with respect to the digital versatile disc than the first search key,
   comparing the first search key with records in the database,
   determining that the comparing does not produce a match, and
   in response to the determining, comparing the second search key with records in the database to identify one or more possibly matching records.

2. A method as recited in claim 1, further comprising reading at least one of the volume name of the digital versatile disc and the time stamp information for creation of a master of the digital versatile disc from Universal Disk Format sectors of the digital versatile disc.

3. A method as recited in claim 1, further comprising reading at least one of the number of titles, the number of chapters per title, and the number of frames per chapter from Video Manager Information and Video Title Set Information data on the digital versatile disc.

4. A method as recited in claim 1, wherein the first search key is based on at least two fields from the plurality of non-blank information fields.

5. A method as recited in claim 1, wherein the second search key is based on at least two fields from the plurality of non-blank information fields.

6. A method as recited in claim 1, wherein the second search key comprises as least a portion of the first search key.

7. A method as recited in claim 1, wherein the determining that the comparing does not produce a match comprises determining that the comparing does not produce an exact match.

8. A system for finding at least one record in a database corresponding to a digital versatile disc, comprising:
   an input unit to obtain disc information comprising at least one non-blank information field value from the digital versatile disc, the at least one non-blank information field value being selected from a plurality of non-blank information fields, the plurality of non-blank information fields comprising a title of the digital versatile disc, a volume name of the digital versatile disc, time stamp information for creation of a master of the digital versatile disc, a number of titles on the digital versatile disc, a number of chapters per title on the digital versatile disc, and a number of frames per chapter on the digital versatile disc;
   a storage unit to store a database of information about digital versatile discs; and
   a processor, coupled to said input unit and said storage unit, to identify one or more possibly matching records in the database of information about digital versatile discs using the at least one non-blank information field value, the processor to identify one or more matching records by:
   generating a first search key based on the disc information,
   generating a second search key based on at least one field from the plurality of non-blank information fields, search key being less specific with respect to the digital versatile disc than the first search key,
   comparing the first search key with records in the database,
   determining that the comparing does not produce a exact match, and
   in response to the determining, comparing the second search key with records in the database to identify one or more possibly matching records.

9. A system as recited in claim 8, wherein said processor, said storage unit and said input unit are connected locally.

10. A system as recited in claim 8, further comprising a connection to a computer network to provide communication between said processor and said storage unit disposed at remote locations.

11. A system for finding at least one record in a database corresponding to a digital versatile disc, the system comprising one or more processors configured to implement:
   means for receiving unique information about the digital versatile disc, the unique information including at least one non-blank information field selected from a plurality of non-blank information fields, the plurality of non-blank information fields comprising a title of the digital versatile disc, a volume name of the digital versatile disc, time stamp information for creation of a master of the digital versatile disc, a number of titles on the digital versatile disc, a number of chapters per title on the digital versatile disc, and a number of frames per chapter on the digital versatile disc;
   means for generating a first search key based on the unique information;
   means for generating a second search key based on at least one field from the plurality of non-blank information fields, the second search key being less specific with respect to the digital versatile disc than the first search key;
   means for comparing the first search key with records in the database;
   means for determining that the comparing does not produce a match; and
   means for in response to the determining, comparing the second search key with records in the database to identify one or more possibly matching records.

* * * * *

UNITED STATES PATENT AND TRADEMARK OFFICE
CERTIFICATE OF CORRECTION

| | | |
|---|---|---|
| PATENT NO. | : 7,856,443 B2 | Page 1 of 1 |
| APPLICATION NO. | : 10/917686 | |
| DATED | : December 21, 2010 | |
| INVENTOR(S) | : Christopher Commons et al. | |

It is certified that error appears in the above-identified patent and that said Letters Patent is hereby corrected as shown below:

On page 3, under "Other Publications", in column 1, line 46, delete "the the" and insert -- the --, therefor.

In column 1, line 48, after "Disc" insert -- , --.

In column 3, line 31, after "invention" insert -- . --.

In column 7, line 63, in Claim 6, delete "as" and insert -- at --, therefor.

In column 8, line 25, in Claim 8, delete "search" and insert -- the second search --, therefor.

Signed and Sealed this
Eighth Day of March, 2011

David J. Kappos
*Director of the United States Patent and Trademark Office*